Figure 1:
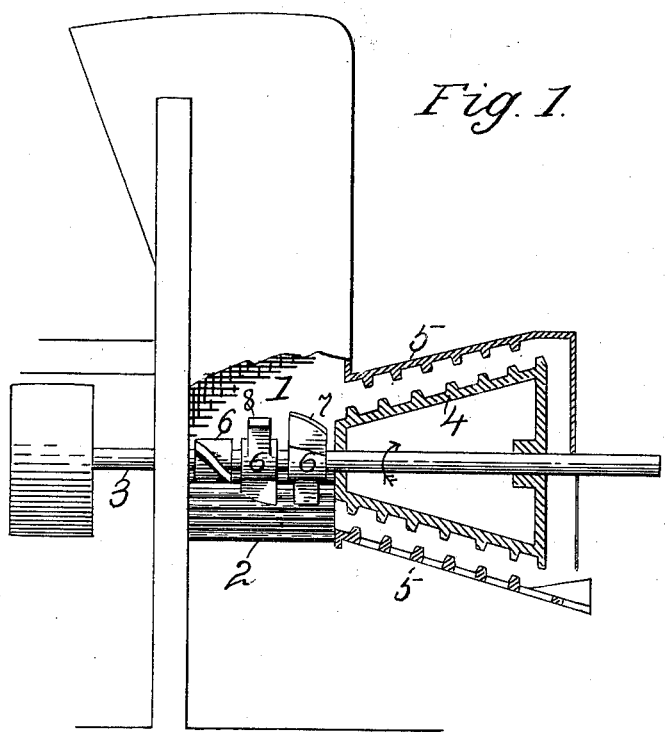

No. 736,615. PATENTED AUG. 18, 1903.
A. R. MONTGOMERY.
CORN SHELLER.
APPLICATION FILED NOV. 21, 1902.
NO MODEL.

Witnesses.
Nora Graham.
Fary Graham.

Inventor.
Alexis R. Montgomery
by L. P. Graham
his attorney.

THE NORRIS PETERS CO., PHOTO-LITHO., WASHINGTON, D. C.

No. 736,615. Patented August 18, 1903.

UNITED STATES PATENT OFFICE.

ALEXIS R. MONTGOMERY, OF DECATUR, ILLINOIS.

CORN-SHELLER.

SPECIFICATION forming part of Letters Patent No. 736,615, dated August 18, 1903.

Application filed November 21, 1902. Serial No. 132,750. (No model.)

*To all whom it may concern:*

Be it known that I, ALEXIS R. MONTGOMERY, of the city of Decatur, county of Macon, and State of Illinois, have invented certain new and useful Improvements in Corn-Shellers, of which the following is a specification.

This invention provides simple and effective means for shelling corn in the throats of shellers while forcing the corn into the shelling-space between the concave and the cone or cylinder.

The invention is exemplified in the structure hereinafter described, and it is defined in the appended claims.

A corn-sheller of the advanced type comprises an externally-toothed cone mounted on a horizontal shaft and incased by an internally-toothed concave. An opening is made in the sheller-casing at the small end of the cone to receive the corn, an appliance is placed on the shaft in the throat of the cylinder to force the corn into the space between the cone and the concave, and it is desirable for several reasons that the feeding appliance shall shell a large per cent. of the corn. One advantage in shelling corn in the throat of the sheller by means of the feeding appliance is based on the general principle that it is mechanical economy to get all the work possible with a given expenditure of force, and specific advantages are as follows: The under part of the throat of the casing is composed of a set of bars or rods separated to give a large degree of freedom for the passage of shelled corn, cobs and husks do not pass between the rods to any detrimental extent, and that part of the separating-sieve under the throat of the sheller is particularly free from obstructions and well capable of taking care of a large quantity of shelled corn. When there is but little shelling in the throat of the sheller, the unshelled corn passes into the space between the cone and the concave, much of the corn shelled therein passes through the sheller with the cobs and husks, and the mass smothers the sieve to an extent that some of the grains are unable to find a way through the sieve and are carried off with the husks or cobs.

Heretofore the throats of shellers have been supplied with continuous spiral feeders in some instances which have fed the corn into the sheller quite effectively without producing much result so far as shelling is concerned, and in other instances non-feeding beaters have been used, with the result that shelling in the throat has been accomplished at the expense of a curtailment of the general efficiency of the sheller through slowness of feed.

My invention is designed to provide means for feeding the corn into the sheller proper as fast as a proper amount of shelling in the throat will permit and to shell as much in the throat as is consistent with a proper degree of speed in the feeding. To accomplish this result, I make a set of collars adapted to fit on the sheller-shaft, extend an oblique feeding-blade from one side of each collar, and extend a non-feeding beater from the opposite side of the collar. The set of collars are fastened onto the shaft with the feeder-blades each presented in a different direction in a break-joint or non-coincident manner, and when corn is supplied to the throat of the sheller and the sheller-shaft is turned in the proper direction the feeder-blades will advance the corn toward the sheller, while the beaters coact with the rods of the casing to shell the corn, and the full capacity of the sheller is attained without overtaxing the sieves.

Figure 2:
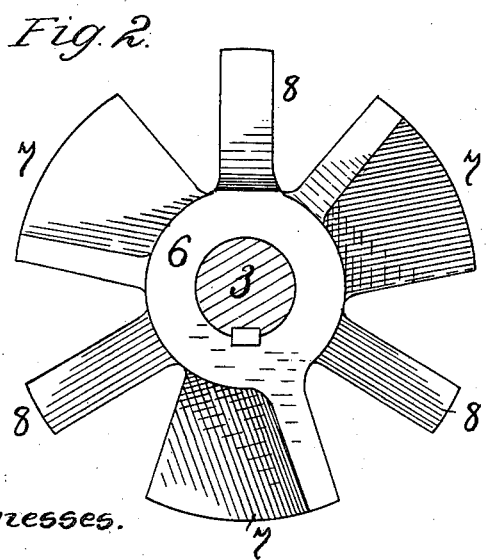
Figure 3:
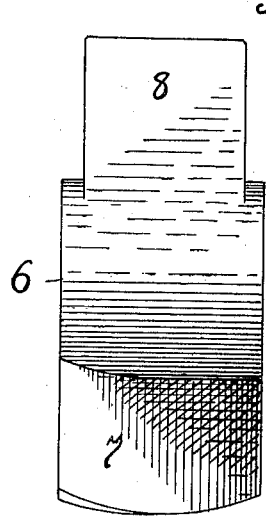

In the drawings forming part of this specification, Figure 1 is a representation, partly in side elevation and partly in vertical section, of so much of a sheller as is needed to explain my invention. Fig. 2 is an end view of a set of combined feeders and shellers properly arranged on the sheller-shaft. Fig. 3 is a diagram of one of the combined shellers and feeders.

The throat of the sheller is shown at 1 in Fig. 1, and the rods that form the lower part of the throat-casing are shown at 2. The sheller-shaft is designated by reference-numeral 3. The cone of the sheller, commonly called the "cylinder," is shown at 4, and the concave of the sheller is shown at 5. The collars for the combined feeders and beaters are shown at 6. The feeder-blades are shown at 7, and the sheller-beaters are shown at 8.

The number of combined feeders and beaters may be varied to meet various requirements, the degree of obliquity of the feeder-blades may be made to suit different conditions, and the general shape and proportion of the different features may be altered without departing from the principle of my invention. The gist of the invention is present in any embodiment in which feeding-blades are alternated or intermingled with non-feeding sheller-blades on the shaft in the throat of the sheller.

I claim—

1. A combined feeder and sheller for the throats of corn-shellers; comprising a set of collars fastened onto the sheller-shaft in the throat of the sheller, each collar having an oblique feeding-blade extending in one direction and a non-feeding beater-blade extending in another direction.

2. A combined feeder and sheller for the throats of corn-shellers; comprising a set of collars fastened onto the sheller-shaft in the throat of the sheller, each collar having an oblique feeder-blade extending in one direction and a non-feeding beater-blade extending in another direction, the collars being so disposed that their respective feeders are presented in various non-coincident directions.

In testimony whereof I sign my name in the presence of two subscribing witnesses.

ALEXIS R. MONTGOMERY.

Witnesses:
T. B. EWING,
W. H. CAKE.